United States Patent
Iriyama

(10) Patent No.: US 6,366,846 B2
(45) Date of Patent: Apr. 2, 2002

(54) VEHICLE DRIVING CONTROL SYSTEM

(75) Inventor: Masahiro Iriyama, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/814,064

(22) Filed: Mar. 22, 2001

(30) Foreign Application Priority Data

May 25, 2000 (JP) ........................................ 2000-154831

(51) Int. Cl.$^7$ ............................................... B60K 31/00
(52) U.S. Cl. ........................... 701/97; 701/93; 180/178; 180/179
(58) Field of Search ...................... 701/93, 97; 180/169, 180/170, 171, 178, 179; 123/352, 396.7, 349, 436, 479

(56) References Cited

U.S. PATENT DOCUMENTS 4,924,397 A  *  5/1990  Kurihara et al. .............. 701/97
5,845,726 A  *  12/1998  Kikkawa et al. .............. 701/93

FOREIGN PATENT DOCUMENTS

JP          9-240313 A      9/1997
JP          10-299554 A     11/1998

* cited by examiner

Primary Examiner—William A. Cuchlinski, Jr.
Assistant Examiner—Marthe Y. Marc-Coleman
(74) Attorney, Agent, or Firm—Shinjyu Global IP Counselors, LLP

(57) ABSTRACT

A vehicle driving control system is provided with failsafe for vehicles equipped with an electronically controlled throttle system. A central processing unit receives an output from a normally closed switch that turns OFF in response to a braking operation and an output from a logic circuit that outputs a pulse signal when normally closed switch is ON. When the normally closed switch turns OFF or the pulse signal from the logic circuit stops, it is determined that a braking operation is being performed. Accordingly, the constant speed driving control is canceled. Since a braking operation is detected by both the signal from the normally closed switch the signal from the logic circuit, the system will not lose the ability to cancel the driving control even when there is a problem with one of these circuitry arrangements.

22 Claims, 3 Drawing Sheets

VEHICLE DRIVING CONTROL SYSTEM

BACKGROUND OF THE INVENTION

1. Field of the Invention

This invention generally relates to a driving control system for a vehicle. More specifically, the present invention relates to a driving control system that automatically controls vehicle speed failsafe.

2. Background Information

Vehicle driving control systems generally include constant speed driving control systems or so-called "cruise control systems" that automatically control the travel of a vehicle at a fixed speed designated by the driver. An example of such a driving control system will now be briefly explained. When the driver executes an operation such as depressing a brake pedal that closes a the set switch, the vehicle speed detected by a speed sensor at that instant is stored as the target value in a controller of a constant speed driving control unit. From then afterwards, the opening of an engine throttle valve is feedback-controlled in such a manner that an actual vehicle speed matches the target vehicle speed. A vacuum motor is coupled to the throttle valve to serve as an actuator for automatically controlling the throttle valve opening. The opening of the throttle valve is normally controlled by the operation of an accelerator pedal connected to throttle valve via a cable. However, during the constant speed driving control, the opening of throttle valve is controlled by the vacuum motor. More specifically, the controller varies the throttle position of the engine by using a control valve to regulate the operating vacuum pressure supplied to the vacuum motor.

The constant speed driving control executed by the controller is canceled when the driver manually releases the constant speed driving control, or when controller detects that the accelerator pedal or a brake pedal is being operated. Upon detecting such operation, the controller automatically cancels the constant speed driving control.

Since automatic cancellation induced by a braking operation is particularly important, a dual circuit is used as a failsafe measure. The dual circuit is provided with two switches that are connected in parallel. One of the switches is normally open, while the other switch is normally closed. When brake pedal is depressed, the normally open switch closes and the normally closed switch opens. The circuit containing the normally open switch is inputted to the controller. When the controller detects that the normally open switch is being closed due to a braking operation, the controller terminates the constant speed driving control.

Meanwhile, together with a self-holding relay the normally closed switch forms a power supply circuit for the control valve. When the set switch closes, the self-holding relay also closes and supplies current to the control valve. But when the brake pedal is operated, the normally closed switch opens. Accordingly, the self-holding relay opens and shuts off the current to the control valve, thus canceling the constant speed driving control. At this time, the self-holding state of the self-holding relay is also canceled. Therefore, the constant speed driving control remains canceled until the normally closed switch is closed and the set switch is operated again.

As described above, the conventional driving control system is provided with two switches that respond to braking operations. Consequently, even if, for example, the normally open switch becomes stuck in the closed state, the constant speed driving control can still be cancelled in a reliable fashion.

In contrast to conventional throttle control mechanisms that transmit the depression of the accelerator pedal to the throttle valve via a cable, the electronically controlled throttle devices that control the throttle opening using only an actuator have come to be utilized in vehicles of recent years. With an electronically controlled throttle device, the operation of the accelerator pedal is converted into an electric signal by a sensor. Accordingly, the controller controls the opening of the throttle valve by driving the actuator such as a step motor using this electric signal.

Therefore, such arrangement can provide the automated constant speed control similar to the conventional constant speed control by incorporating the constant speed control function into the controller. However, in such arrangement, the throttle opening is controlled solely through the actuator. Therefore, the current to the actuator cannot be shut off as a failsafe measure to cancel the constant speed control, since once the current to the actuator is shut off, the throttle valve cannot be controlled even manually. That means, the only available failsafe measure is to block a command to activate the constant speed control in a program within the central processing unit (CPU). However, this measure does not work if there is a problem with the input port of the central processing unit, because the program within the central processing unit will not recognize a braking operation in such situation. Accordingly, in the worst case scenario, the driver would not be able to cancel the driving control. As a possible remedy, the electronically controlled throttle device and the constant speed driving control device could be provided as completely separate controllers. Or, if the constant speed driving control function is incorporated into the electronically controlled throttle device, two central processing units could be utilized. However, neither of these remedies is realistic in view of the cost and the difficulties of installation into the vehicle.

In view of the above, there exists a need for vehicle driving control system, which overcomes the abovementioned problems in the prior art. This invention addresses this need in the prior art as well as other needs, which will become apparent to those skilled in the art from this disclosure.

SUMMARY OF THE INVENTION

The object of the present invention is to provide a driving control system that achieves the failsafe function in a secure manner at a low cost. The aforementioned object can be attained by providing a vehicle driving control apparatus for a vehicle, comprising a vehicle speed detector, a braking detector, a driving force regulator, and a driving controller with a pulse signal generator and a logic circuit. The vehicle speed detector produces a speed signal indicative of an actual speed of the vehicle. The driving force regulator adjusts a driving force of the vehicle. The braking detector generates a braking signal indicative of a braking operation. The driving controller controls the driving force regulator so that the actual vehicle speed matches a prescribed target vehicle speed, and cancels control of the driving force regulator when the driving controller determines that a braking operation is being performed based on the braking signal from the braking detector. The pulse signal generator is configured to generate a pulse signal. The logic circuit is configured to receive the braking signal from the braking detector and the pulse signal from the pulse signal generator, such that the driving controller determines if a braking operation has been performed based on the pulse signal outputted from the logic circuit.

These and other objects, features, aspects and advantages of the present invention will become apparent to those

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention are provided for illustration only, and not for the purpose of limiting the invention as defined by the appended claims and their equivalents.

Figure 1:
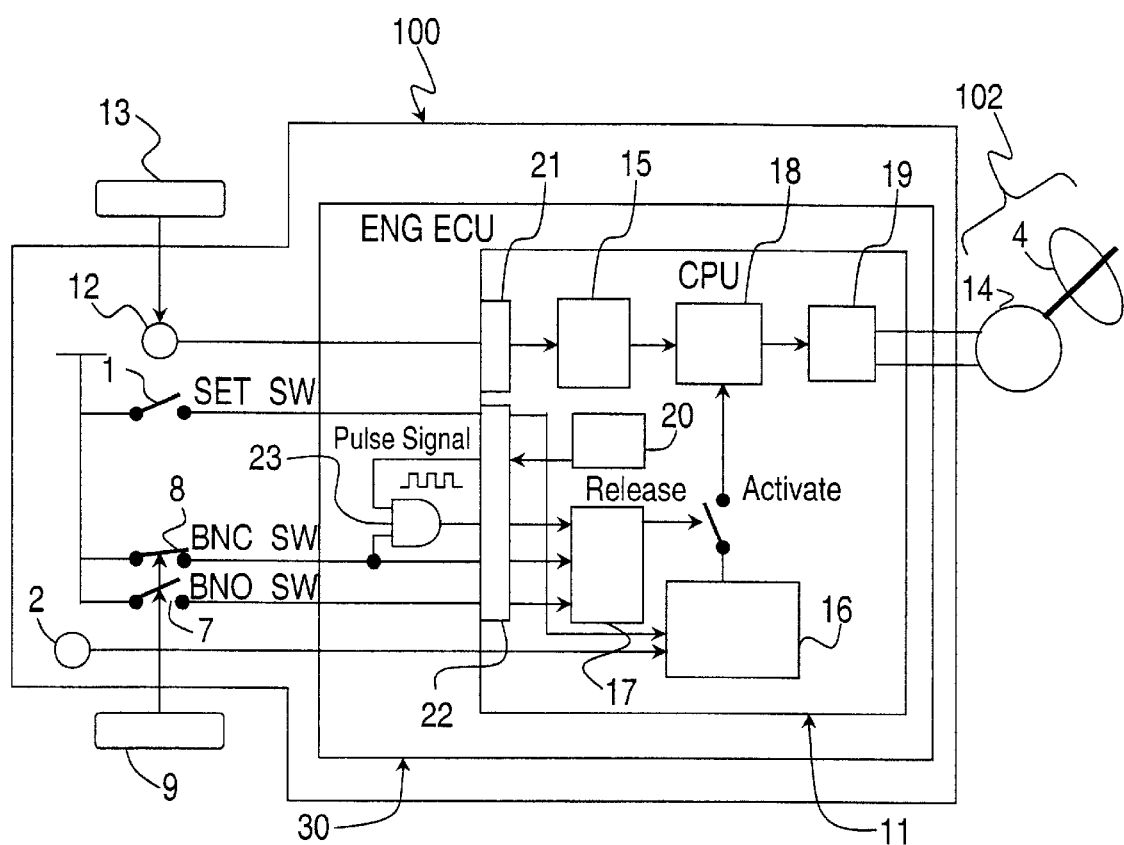
FIG. 1 is a block view of a vehicle driving control system in accordance with a first embodiment of the present invention.

Referring initially to FIG. 1, a vehicle driving control system 100 is illustrated to explain a first embodiment of the present invention. The vehicle driving control system 100 preferably includes an electronic throttle control device 102 which functions as a driving force regulator or a driving force regulating means. Electronic throttle control device 102 includes an actuator or throttle motor 14 and a throttle valve 4. The vehicle driving control system 100 further includes an engine electric controller 30 or driving control means, a set switch 1 for constant speed control, a vehicle speed detector or sensor 2 or vehicle speed detection means, a normally open switch 7, a normally closed switch 8, and an accelerator pedal sensor 12. The normally open switch 7, the normally closed switch 8, and the accelerator pedal sensor 12 all function as a braking detector or a braking detection means. The vehicle driving control system 100 is operatively coupled to a brake pedal 9 and an accelerator pedal 13 of the vehicle.

The electronic throttle control device 102 controls the throttle motor 14 in such a manner that the throttle valve 4 achieves a target throttle opening calculated based on an accelerator pedal depression amount and other predetermined operating parameters. Therefore, the electronic throttle control device 102 also functions as a driving control or a driving control means by providing the constant speed driving function.

The accelerator pedal 13, the accelerator pedal sensor 12, the normally open switch 7, the normally closed switch 8, the brake pedal 9, the vehicle speed sensor 2 the throttle motor 14 and the throttle valve 4 are all relatively conventional components that are well known in the art. Since accelerator pedals, accelerator pedal sensors, normally open switches, normally closed switches, brake pedals, vehicle speed sensors, throttle motors and throttle valves are well know in the art, detailed explanation of structures and functions of these parts will be omitted herein.

The controller 30 preferably includes a central processing unit or CPU 11 and a logic circuit 23 that is preferably an AND gate. The central processing unit 11 is arranged inside the engine controller 30 and includes a microcomputer that conducts signal input/output processing and computational processing required for throttle control and driving control. In other words, the microcomputer of the central processing unit 1 operates control programs that control the throttle control and driving control as discussed below. The controller 30 can also include other conventional components such as an input interface circuit, an output interface circuit, and storage devices such as a ROM (Read Only Memory) device and a RAM (Random Access Memory) device. The memory circuit stores processing results and control programs such as ones for throttle control and driving control that are run by the processor circuit. The internal RAM and the internal ROM of the controller 30 stores statuses of operational flags, and various control data and operations as necessary to carry out the present invention. It will be apparent to those skilled in the art from this disclosure that the precise structure and algorithms for the controller 30 can be any combination of hardware and software that will carry out the functions of the present invention. In other words, "means plus function" clauses as utilized in the specification and disclosure should include any structure or hardware and/or algorithm or software that can be utilized to carry out the function of the "means plus function" clause.

The accelerator pedal sensor 12 detects the amount that the accelerator pedal 13 is depressed. The throttle motor 14 drives the throttle valve 4 in response to commands from the central processing unit 11.

The central processing unit 11 includes a memory (not shown in figures), a plurality of processing sections 15–20, and a plurality of ports 21–22. The sections 15–20 process functions provided on the memory of the central processing unit 11. More particularly, the central processing unit 11 has a throttle opening command value computing section 15, a constant speed control computing section 16, a constant speed control cancellation determining section 17, a command value switching section 18, a throttle motor control section 19, and a pulse signal generating section 20. The central processing unit 11 also includes an analog input/output port 21 and a digital input/output port 22. The analog input/output port 21 converts an analog signal from the accelerator pedal sensor 12 into a digital signal, and feeds the digital signal to the throttle opening command value computing section 15. The digital input/output port 22 transfers a binary signal from each circuit, i.e., from the set switch 1, the normally open switch 7, and the normally closed switch 8.

The logic circuit 23 is provided inside the controller 30, and operates using a pulse signal inputted from the pulse signal generating section 20 via the digital input/output port 22 and a signal inputted from the normally closed switch 8. The output pulse signal from the logic circuit 23 is fed to the constant speed control cancellation determining section 17 via the digital input/output port 22.

The logic circuit 23 outputs a pulse signal when the normally closed switch 8 is closed. A braking operation is determined to be occurring when the pulse signal from the logic circuit 23 stops. Meanwhile, even if the signal from the normally closed switch 8 becomes stuck in the ON condition (closed position) due to a failure in the corresponding signal input circuitry, the pulse signal from the logic circuit 23 will stop if the normally closed switch 7 opens due to a braking operation. As a result, the braking operation is detected and the driving or cruise control will be canceled.

A similar function can be attained in an arrangement in which a normally open switch 8 is connected to logic circuit 23, which is a NAND gate. In this case, the NAND gate outputs a pulse signal when the normally open switch 8 is open.

In this embodiment, the pulse signal generating section 20 is provided inside the central processing unit 11. Alternatively, the pulse signal generating section 20 can be provided separately from the central processing unit 11. However, since CPUs are generally equipped with a clock pulse, the system can be simplified by using the clock pulse to generate the pulse signal.

The throttle opening command value computing section 15 computes a command value for the throttle opening based on the accelerator pedal depression amount signal received via the analog input/output port 21 from the accelerator pedal sensor 12. The throttle opening command value computing section 15 then outputs a command value to the command value switching section 18. Except when the constant speed control is being activated, which will be discussed later, the command value switching section 18 outputs the throttle opening command value to the throttle motor control section 19. The throttle motor control section 19 outputs the throttle opening command value to the throttle motor 14, which drives the throttle valve 4 according to the throttle opening command value. In other words, the same microprocessor is utilized to conduct both the control processing for the target throttle opening and the control processing for the target vehicle speed.

The constant speed control computing section 16 computes a throttle opening command value during the constant speed control based on a signal from the digital input/output port 22 and a vehicle speed signal from the vehicle speed sensor 2. The signal from the digital input/output port 22 indicates the status of the set switch 1. The constant speed control computing section 16 then outputs the computed value to the command value switching section 18. The constant speed control computing section 16 stores the vehicle speed as the target vehicle speed at the time when the set switch 1 is turned ON (closed). Then, the constant speed control computing section 16 computes command values to be sent to the throttle motor 14, while monitoring the vehicle speed signal, such that the actual vehicle speed coincides with the target vehicle speed. Accordingly, the constant speed control computing section 16 conducts a feedback-control on the opening of the throttle valve 4. During this feedback control, the command value switching section 18 gives priority to the command values inputted from the constant speed control computing section 16 over the command values inputted from the throttle opening command value computing section 15, outputting the former instead of the latter to the throttle motor control section 19. In this manner, the vehicle driving control system 100 executes constant speed driving or cruise control that does not depend on the operation of the accelerator pedal 13.

The constant speed control cancellation determining section 17 determines whether or not to cancel the constant speed control based on the status of the switches and the presence or absence of the pulse signal. The constant speed control cancellation determining section 17 receives binary signals from the normally open switch 7 and the normally closed switch 8 via the digital input/output port 22. The constant speed control cancellation determining section 17 also receives pulse signals from the logic circuit 23. The operations of the normally open switch 7 and the normally closed switch 8 are the same as the operations of the switches shown in FIG. 3. In other words, the normally open switch 7 closes and the normally closed switch 8 opens when brake pedal 9 is depressed.

Figure 2:
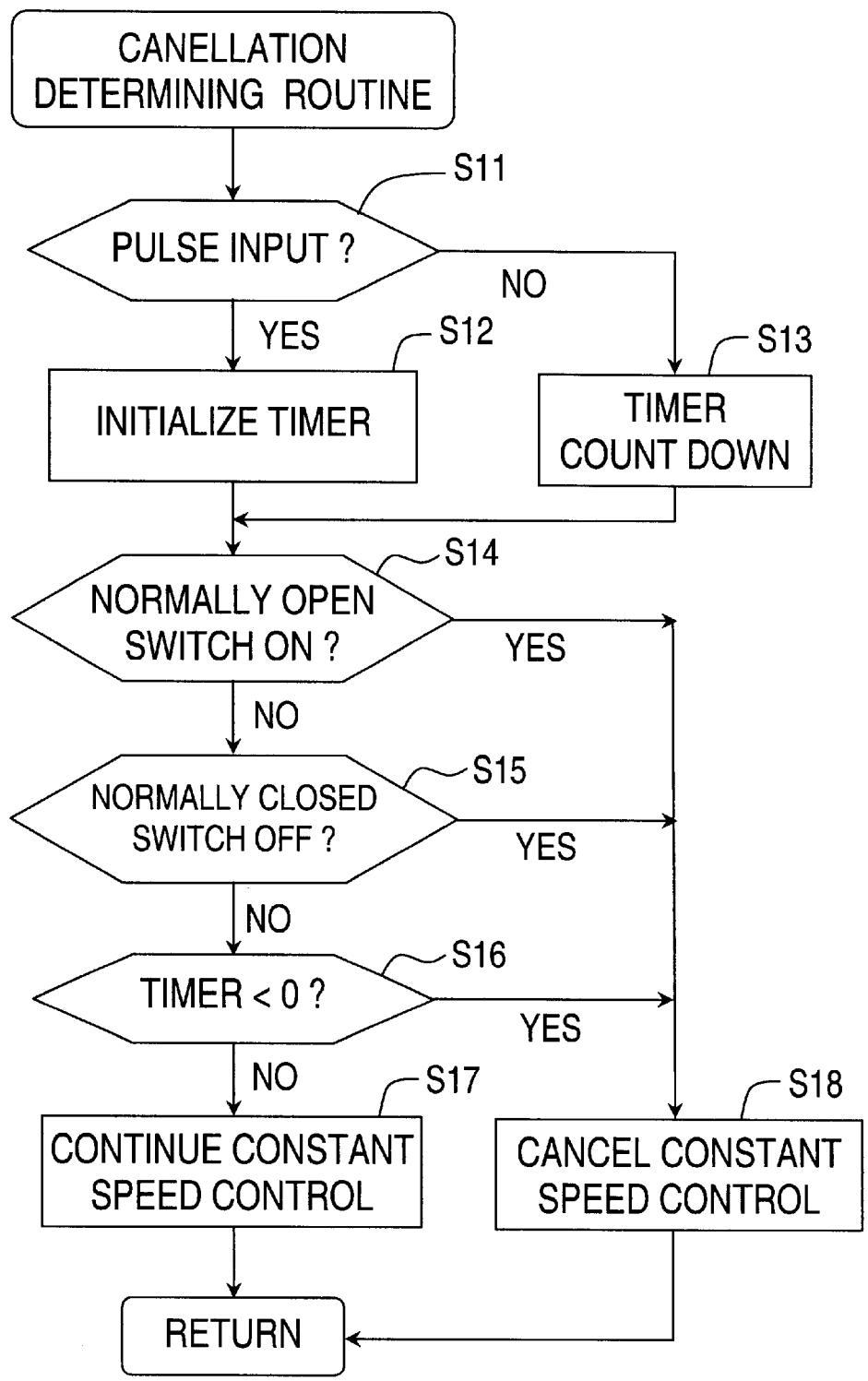
FIG. 2 is a flowchart illustrating the cancellation determining routine for the constant speed driving control performed in accordance with selected embodiments.

FIG. 2 shows the processing routine of the constant speed control cancellation determination. This routine is executed on a periodic basis during the constant speed control. Here, the cancellation determination operation will now be explained in reference to the routine shown in FIG. 2.

First, in step S11, it is determined whether or not a pulse signal is inputted into the digital input/output port 22 from the AND gate 23. By making the period of the pulse signal that is inputted into the AND gate 23 and the period of the processing routine the same, whether or not the pulse signal is properly inputted can be determined by determining whether the values of the signals are different in the previous cycle and the current cycle.

If it is determined that the pulse signal has been inputted, the determination timer is initialized in step S12. In this case, the determination timer is set to a predetermined value for counting down. Conversely, if the values of the pulse signals are fixed at High or Low at its input portion, the time left in the timer is counted down by a predetermined amount in step S13.

Therefore, the pulse signal from the AND gate 23 is inputted to the central processing unit 11 when both the pulse signal from the pulse signal generating section 20 and the signal from the normally closed switch 8 that is transmitted while the normally closed switch 8 is closed (ON) are inputted to the AND gate 23. Thus, so long as there is not a problem with the digital input/output port 22, the pulse signal is inputted constantly while the brake pedal 9 is not operated. On the other hand, the pulse signal is stopped when the brake pedal 9 is operated.

Next, in step S14, the open/closed status of the normally open switch 7 is determined. If the status of the normally opened switch 7 is closed or ON, which indicates that braking operation is being performed, the command value output from the constant speed control computing section 16 to the command value switching section 18 is shut off. Accordingly, the constant speed driving control is canceled in step S18. After the constant speed driving control is canceled, the command value switching section 18 outputs command values from the throttle opening command value computing section 15 to the throttle motor 19. As a result, the throttle opening is regulated according to the driver's operation of the accelerator pedal 13.

If the normally open switch 7 is open or OFF in step S14, the input from the normally closed switch 8 is checked (step S15). If the normally closed switch 8 is open or OFF, which indicates that a braking operation is being performed, the command value output from constant speed control computing section 16 to command value switching section 18 is shut off. Accordingly, the constant speed driving or cruise control is canceled (step S18). Thus, the constant speed driving control can be canceled even when the normally open switch 7 does not close or the normally closed switch 8 does not open in response to a braking operation due to a mechanical failure.

If it is determined that the normally closed switch 8 is closed or ON by checking whether there is a digital input from the normally closed switch 8 in step S15, the timer value which has been initialized or counted down in the aforementioned steps S11 to S13 is checked (step S16). The constant speed driving control is canceled when the timer value has reached below 0 due to the count down. In other words, step S18, a predetermined amount of time has elapsed since the pulse signal has stopped being inputted to the central processing unit 11. On the other hand, if the predetermined amount of time has not elapsed, the constant speed control is continued until the predetermined amount of time elapses (step S17).

Therefore, even when there is a problem with the input of either the signal from the normally closed switch 8 or the signal from the logic circuit 23, the ability to cancel the driving control will not be affected. Furthermore, if the signal from the normally closed switch 8 and the output signal from the logic circuit 23 do not match with respect to whether a braking operation is being performed, the constant speed control is canceled. Therefore, even when there is a problem with the digital input/output port 22, the constant speed control can still be canceled. Furthermore, since the pulse signal is a dynamic signal that inverts periodically, even when the pulse signal itself stops or the output pulse signal stops being inputted due to a problem in the digital input/output port 22, the problem can be detected. Accordingly, the driving control for the target vehicle speed can be canceled.

In this embodiment, the braking detector or braking detection means includes the normally open switch 7 that closes in response to a braking operation performed by the driver, and the normally closed switch 8 that opens in response to a braking operation performed by the driver, which are provided in parallel. Accordingly, the controller 30 determines that a braking operation is being performed when at least one of the switches 7 and 8 detects a braking operation. Therefore, it is possible to cancel the constant speed control even if one of the switches 7 and 8 fails. Furthermore, together with the ability to determine a braking operation based on the pulse signal from the logic circuit 23, the reliability of the system is further increased.

More specifically, the constant speed driving control continues while the pulse signal input to the central processing unit 11 is present, so long as the normally open switch 7 is open or OFF and the normally closed switch 8 is closed or ON. In other words, the constant speed control continues so long as no braking operation is performed. Likewise, the constant speed driving control is canceled when the normally open switch 7 is closed or ON, or the normally closed switch 8 is open or OFF, such that a braking operation is performed. This process makes it possible to cancel the constant speed driving control when either of the normally open switch 7 and the normally closed switch 8 fails. Furthermore, if the pulse signal input stops, the constant speed driving control will be canceled when a set amount of time elapses since the pulse signal stopped, regardless of the statuses of the normally open switch 7 and the normally closed switch 8. Therefore, even if a failure occurs in the signal input circuitries of the central processing unit 11 through which the signals from the normally open switch 7 and the normally closed switch 8 are inputted, the failure will be detected, and the constant speed driving control will be canceled.

SECOND EMBODIMENT

Figure 3:
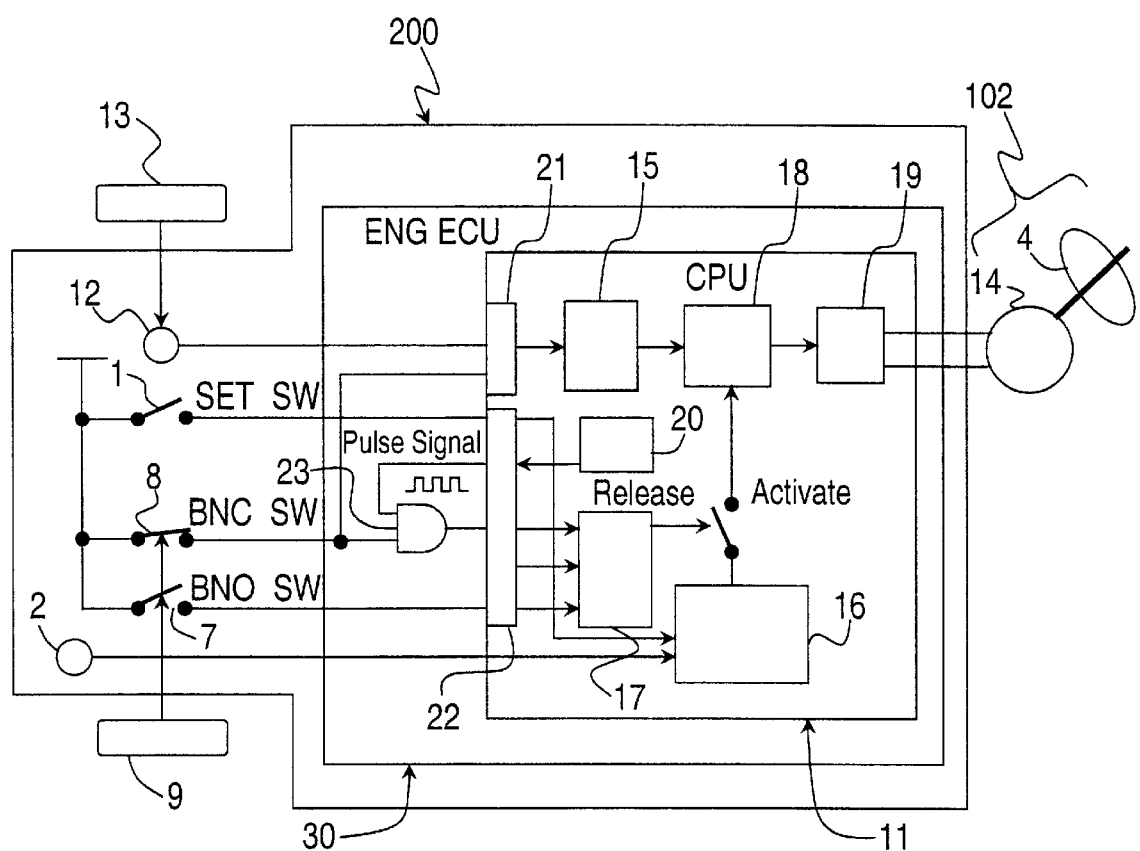
FIG. 3 is a block view of vehicle driving control system in accordance with a second embodiment of the present invention.

Referring now to FIG. 3, a vehicle driving control system 200 in accordance with a second embodiment of the present invention will now be explained. Since most of the components of the vehicle driving control system 100 in FIG. 1 are identical to corresponding components of the vehicle driving control system 200 shown in FIG. 3, only the components of the vehicle driving control system 200 that are structurally or functionally different from the vehicle driving control system 100 will be explained herein. In FIG. 1, the components of the vehicle driving control system that are functionally identical to corresponding components in FIG. 3 are indicated with the same referential numerals.

In the first embodiment, the outputs from the normally open switch 7, the normally closed switch 8, and the logic circuit 23 are fed into the digital input/output port 22. However, it is also possible to feed some of these outputs, e.g., the outputs from the normally closed switch 8, to the analog input/output port 21. In this case, signals from the normally closed switch 8 are inputted into the analog input/output port 21, while signals from the normally open switch 7 and the logic circuit 23 are inputted to the digital input/output port 22. In other words, a determination of whether a braking operation is being performed is conducted using two different ports, the analog and digital input/output ports 21 and 22.

This arrangement increases the reliability of the system, since the constant speed driving control can be cancelled even when one of the analog and digital input/output ports 21 and 22 experiences a serious failure, by using the other of analog and digital input/output ports 21 and 22. Although it is possible to detect a failure in the digital input/output port 22 by using the digital input/output port 22 alone, it takes a while for the controller 30 to determine that the pulse signal has stopped due to a problem in the digital input/output port 22. By utilizing both the analog and digital input/output ports 21 and 22, the controller 30 can cancel the constant speed control quicker. That is, even if the digital input/output port 22 is inoperative, if the driver operates brake pedal 9 and turns OFF the normally closed switch 8, the normally closed switch 8 stops transmitting signals to the analog input/output port 21. Accordingly, the controller 30 can determine that there is a problem in digital input/output port 22, and cancel the constant speed control.

Also, while this embodiment uses the same controller 30 to conduct both the throttle opening control and the constant speed driving control, it is clearly possible to implement the present invention using separate controllers for each of these control functions, such as a constant speed driving control device and an automatic vehicle speed controlling device. The constant speed driving control device controls the driving force regulating means in such a manner that the actual vehicle speed matches a fixedly set target vehicle speed. The automatic vehicle speed controlling device controls the driving force regulating means in such a manner that the actual vehicle speed matches a variably set target vehicle speed. The target vehicle speed can set by, for example, a vehicle control signal fed from a mobile communications system. More specifically, the present invention can be implemented by utilizing the switches and the logic circuit in one of the controllers. Particularly, the arrangement of the present invention is more favorable than an arrangement in which each controller is equipped with a switch for detecting a braking operation, since such arrangement requires more complicated circuit structure, and therefore becomes more complicated and expensive than the arrangement of the present invention.

The terms of degree such as "substantially", "about" and "approximately" as used herein mean a reasonable amount of deviation of the modified term such that the end result is not significantly changed. These terms should be construed as including a deviation of ±5% of the modified term if this would not negate the meaning of the word it modifies.

This application claims priority to Japanese Patent Application No. P2000-154831. The entire disclosure of Japanese Patent Application No. P2000-154831 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle driving control system for a vehicle, comprising:
    a vehicle speed detector that produces a speed signal indicative of an actual speed of the vehicle;
    a driving force regulator that adjusts a driving force of the vehicle;
    a braking detector that generates a braking signal indicative of a braking operation; and
    a driving controller that controls said driving force regulator so that the actual vehicle speed matches a prescribed target vehicle speed, and cancels control of said driving force regulator when said driving controller determines that a braking operation is being performed based on said braking signal from said braking detector, said driving controller including
        a pulse signal generator configured to generate a pulse signal, and
        a logic circuit configured to receive said braking signal from said braking detector and said pulse signal from said pulse signal generator, such that said driving controller determines if a braking operation has been performed based on said pulse signal outputted from said logic circuit.

2. The vehicle driving control system as set forth in claim 1, wherein
    said driving controller cancels control of said driving force regulator when said braking signal generated by said braking detector and said output pulse signal from said logic circuit do not have consistent indications with respect to whether a braking operation is being performed.

3. The vehicle driving control system as set forth in claim 1, wherein
    said braking detector includes a normally closed switch that opens in response to a braking operation,
    said logic circuit includes an AND gate that generates said output pulse signal when said normally closed switch is closed, and
    said driving controller determines that a braking operation is being performed when said output pulse signal from said AND gate stops.

4. The vehicle driving control system as set forth in claim 1, wherein
    said braking detector includes a normally open switch that closes in response to a braking operation,
    said logic circuit comprises an NAND gate that generates said output pulse signal when said normally open switch is open, and
    said driving controller determines that a braking operation is being performed when said output pulse signal from said NAND gate stops.

5. The vehicle driving control system as set forth in claim 1, wherein
    said braking detector includes a normally open switch that closes in response to a braking operation, and a normally closed switch that opens in response to a braking operation, said normally open switch and said normally open switch being provided in parallel, and
    said driving controller determines that a braking operation is being performed when said normally open switch is closed or said normally closed switch is open.

6. The vehicle driving control system as set forth in claim 5, wherein
    said driving controller includes a microcomputer equipped with a central processing unit that conducts computational processing for controlling said target vehicle speed,
    signals from said normally open switch and said logic circuit are inputted to a digital input/output port of said microcomputer, and
    a signal from said normally closed switch is inputted to an analog input/output port of said microcomputer.

7. The vehicle driving control system as recited in claim 1, wherein
    said driving controller includes a microcomputer equipped with a central processing unit that conducts computational processing for controlling said target vehicle speed, and
    said central processing unit includes said pulse signal generator.

8. The vehicle driving control system as set forth in claim 1, wherein
    said driving force regulator includes a throttle control device, said throttle control device having an engine throttle valve and an actuator that drives said throttle valve, said throttle device controlling said actuator such that said throttle valve achieves a target throttle opening calculated based on an accelerator pedal depression amount.

9. The vehicle driving control system as set forth in claim 8, wherein
    said target throttle opening and said target vehicle speed are conducted by a single microprocessor.

10. The vehicle driving control system as set forth in claim 1, wherein
    said driving controller includes a constant speed driving control device that controls said driving force regulator such that said actual vehicle speed matches a fixedly set target vehicle speed.

11. The vehicle driving control system as set forth in claim 1, wherein
    said driving controller includes an automatic vehicle speed controlling device that controls said driving force regulator such that said actual vehicle speed matches a variably set target vehicle speed.

12. A vehicle driving control system for a vehicle, comprising:
    vehicle speed detection means for detecting an actual speed of the vehicle and producing a speed signal indicative of the actual speed of the vehicle;
    driving force regulating means for adjusting a driving force of the vehicle;
    braking detection means for generating a signal indicative of a braking operation; and
    driving control means for controlling said driving force regulating means so that the actual vehicle speed matches a prescribed target vehicle speed, and canceling control of said driving force regulating means when said driving control means determines that a braking operation is being performed based on said braking signal from said braking detection means, said driving control means including pulse signal generating means for generating a pulse signal, and a logic circuit receiving said signal from said braking detection means and said pulse signal from said pulse signal generating means, such that said driving control means determines if a braking operation has been performed based on an output pulse signal generated from said logic circuit.

13. The vehicle driving control system as set forth in claim 12, wherein said driving control means cancels control when said braking signal generated by said braking detection means and said output pulse signal from said logic circuit do not have consistent indications with respect to whether a braking operation is being performed.

14. The vehicle driving control system as set forth in claim 12, wherein said braking detection means includes a normally closed switch that opens in response to a braking operation, said logic circuit includes an AND gate that generates said output pulse signal when said normally closed switch is closed, and said driving control means determines that a braking operation is being performed when said output pulse signal from said AND gate stops.

15. The vehicle driving control system as set forth in claim 12, wherein said braking detection means includes a normally open switch that closes in response to a braking operation, said logic circuit comprises an NAND gate that generates said output pulse signal when said normally open switch is open, and said driving control means determines that a braking operation is being performed when said output pulse signal from said NAND gate stops.

16. The vehicle driving control system as set forth in claim 12, wherein said braking detection means includes a normally open switch that closes in response to a braking operation, and a normally closed switch that opens in response to a braking operation, said normally open switch and said normally open switch being provided in parallel, and said driving control means determines that a braking operation is being performed when said normally open switch is closed or said normally closed switch is open.

17. The vehicle driving control system as set forth in claim 16, wherein said driving control means includes a microcomputer equipped with a central processing unit that conducts computational processing for controlling said target vehicle speed, signals from said normally open switch and said logic circuit are inputted to a digital input/output port of said microcomputer, and a signal from said normally closed switch is inputted to an analog input/output port of said microcomputer.

18. The vehicle driving control system as recited in claim 12, wherein said driving control means includes a microcomputer equipped with a central processing unit that conducts computational processing for controlling said target vehicle speed, and said central processing unit includes said pulse signal generating means.

19. The vehicle driving control system as set forth in claim 12, wherein said driving force regulating means includes a throttle control device, said throttle control device having an engine throttle valve and an actuator that drives said throttle valve, said throttle device controlling said actuator such that said throttle valve achieves a target throttle opening calculated based on an accelerator pedal depression amount.

20. The vehicle driving control system as set forth in claim 19, wherein said target throttle opening and said target vehicle speed are conducted by a single microprocessor.

21. The vehicle driving control system as set forth in claim 12, wherein said driving control means includes a constant speed driving control device that controls said driving force regulating means such that said actual vehicle speed matches a fixedly set target vehicle speed.

22. The vehicle driving control system as set forth in claim 12, wherein said driving control means includes an automatic vehicle speed controlling device that controls said driving force regulating means such that said actual vehicle speed matches a variably set target vehicle speed.

* * * * *